(12) United States Patent
Schaffer et al.

(10) Patent No.: US 6,260,031 B1
(45) Date of Patent: Jul. 10, 2001

(54) CODE COMPACTION BY EVOLUTIONARY ALGORITHM

(75) Inventors: J. David Schaffer, Wappingers Falls; Keith E. Mathias; Larry J. Eshelman, both of Ossining, all of NY (US)

(73) Assignee: Philips Electronics North America Corp., New York, NY (US)

( * ) Notice: Subject to any disclaimer, the term of this patent is extended or adjusted under 35 U.S.C. 154(b) by 0 days.

(21) Appl. No.: 09/217,408

(22) Filed: Dec. 21, 1998

(51) Int. Cl.$^7$ .................................................. G06N 3/12

(52) U.S. Cl. ...................... 706/13; 706/45; 382/243; 382/232

(58) Field of Search .............................. 706/13; 382/232, 382/243; 375/254

(56) References Cited

U.S. PATENT DOCUMENTS

| | | | |
|---|---|---|---|
| 5,651,099 | * 7/1997 | Konsella | 706/13 |
| 5,734,754 | * 3/1998 | Parker | 382/243 |
| 5,892,847 | * 4/1999 | Johnson | 382/232 |
| 6,128,346 | * 10/2000 | Suarez et al. | 375/254 |

OTHER PUBLICATIONS

Jianmin Jiang; Butler, D., A genetic algorithm design for vector quantization, Genetic Algorithms in Engineering Systems: Innovations and Applications, 1995. Galesia. First International Conference on, Jan. 1995, pp.: 331–336.*

Yiaowei Zheng; Julstrom, B.A.; Weidong Cheng, Design of vector quantization codebooks using a genetic algorithm, Evolutionary Computation, 1997., IEEE International Conference on, Apr. 13–15, 1997, pp.: 525–529.*

Krishna, K.; Ramakrishnan, K.R.; Thathacher, MAL, Vector quantization using genetic K–means algorithm for image compression, Information, Communications and Signal Processing, 1997. ICICS., Proceedings of Sep. 1997 International Conference on, vol.: 3, 9–12.*

Daijin Kim; Sunha Ahn, A MS–GS VQ codebook design for wireless image communication using genetic algorithms, Evolutionary Computation, IEEE Transactions on, vol.: 3 1, Apr. 1999, pp.: 35–52.*

Delport, V., Alternative methods for codebook design in vector quantization, Data Compression Conference, 1995. DCC '95, Proceedings, Mar. 28–30, 1995, pp.: 485.*

Didier Le Gall; MPEG: a video compression standard for multimedia applications; Commun. ACM 34, 4 (Apr. 1991), pp. 46–58.*

Jiang et al., "A Genetic Algorithm for Vector Quantization", First Int'l Conference on Genetic Algorithms in Engineering Systems: Innovations and Applications' Galesia, 1995, pp. 331–336.

* cited by examiner

Primary Examiner—Mark R. Powell
Assistant Examiner—Wilbert L. Starks
(74) Attorney, Agent, or Firm—Gregory L. Thorne

(57) ABSTRACT

A code compaction based on macro substitutions is presented wherein the choice of possible macro substitutions is guided by an evolutionary algorithm process. In a preferred embodiment, a random population of sets of macro substitutions are generated and a compaction effectiveness is evaluated for each set. This random population is partitioned into pairs of "parents", and each pair of parents produce a pair of "offspring". The effectiveness of the compaction provided by each of the offspring is evaluated, and a "survival of the fittest" algorithm is applied to identify the individuals that have the best compaction effectiveness. These preferred individuals are partitioned into pairs of parents who produce pairs of offspring, and the most compaction-effective individuals are selected to be parents for the next generation. This process continues until subsequent generations show insignificant improvement, and the best individual is selected as the solution.

11 Claims, 6 Drawing Sheets

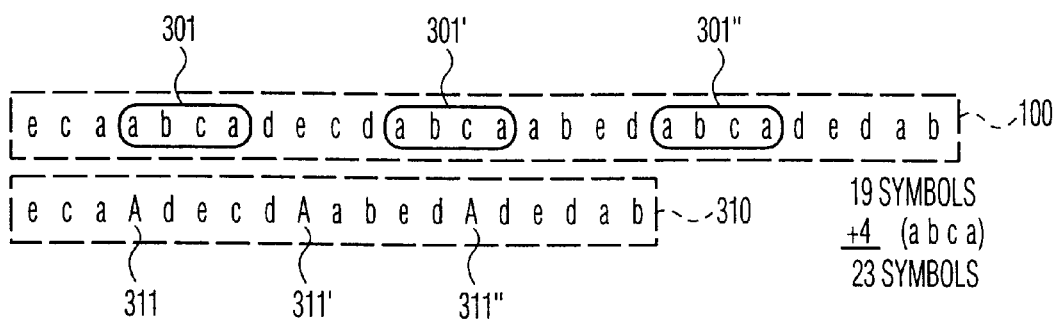
FIG. 2
(PRIOR ART)
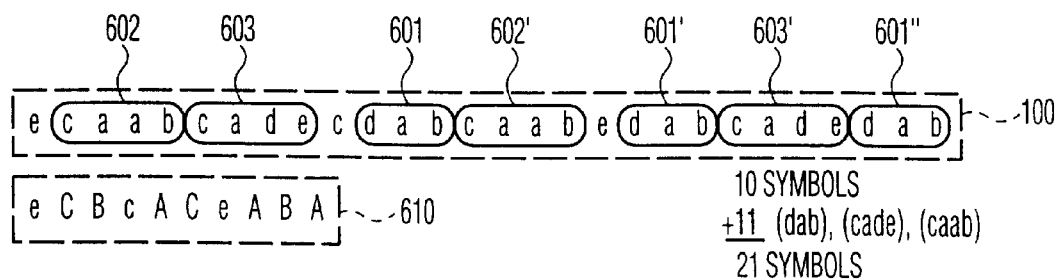
FIG. 3
(PRIOR ART)
FIG. 6

| C m | a b c a | a b c | a a b | b c a | d a b | b c a d | c a d e | d a b c | e d a b | c a a b | c a | c a a | a a b | c a a d | a d e | e d a | b c | d a |
|---|---|---|---|---|---|---|---|---|---|---|---|---|---|---|---|---|---|---|
| 23 | 1 | 1 | 1 | 0 | 0 | 0 | 1 | 0 | 0 | 0 | 0 | 1 | 0 | 0 | 1 | 1 | 0 | 1 |
| 23 | 0 | 0 | 1 | 1 | 0 | 0 | 0 | 0 | 1 | 0 | 1 | 0 | 1 | 0 | 1 | 0 | 1 | 0 |
| 23 | 0 | 0 | 0 | 0 | 1 | 0 | 0 | 0 | 0 | 0 | 0 | 0 | 1 | 1 | 0 | 0 | 0 | 0 |
| 23 | 1 | 0 | 0 | 0 | 1 | 0 | 0 | 0 | 1 | 0 | 1 | 0 | 0 | 0 | 0 | 0 | 0 | 0 |
| 24 | 0 | 0 | 0 | 0 | 0 | 0 | 0 | 1 | 1 | 0 | 1 | 0 | 0 | 0 | 0 | 0 | 1 | 0 |
| 23 | 1 | 1 | 0 | 1 | 0 | 1 | 1 | 0 | 0 | 0 | 0 | 1 | 0 | 1 | 1 | 0 | 0 | 1 |
| 24 | 0 | 0 | 1 | 1 | 0 | 1 | 1 | 0 | 1 | 1 | 0 | 0 | 0 | 0 | 1 | 0 | 1 | 0 |
| 23 | 1 | 0 | 0 | 0 | 1 | 0 | 1 | 0 | 1 | 0 | 0 | 1 | 0 | 0 | 0 | 0 | 0 | 0 | c15 c2 c10 c4 c6 c7 c8 c11

FIG. 5D

| a b c a | a b c | a b | b c a | d a b | b c a d | c a d e | d a b c | e d a b | c a a b | c a | c a a | a a b | c a a d | a d e | e d a | b c | d a | C m |
|---|---|---|---|---|---|---|---|---|---|---|---|---|---|---|---|---|---|---|
| 0 | 0 | 1 | 0 | 0 | 0 | 1 | 1 | 0 | 0 | 0 | 1 | 1 | 0 | 1 | 1 | 1 | 1 | 23 |
| 1 | 0 | 1 | 1 | 0 | 0 | 0 | 0 | 1 | 0 | 1 | 0 | 0 | 0 | 0 | 0 | 1 | 0 | 23 |
| 1 | 0 | 0 | 0 | 1 | 0 | 0 | 0 | 0 | 0 | 0 | 1 | 0 | 0 | 0 | 0 | 0 | 0 | 23 |
| 0 | 0 | 0 | 0 | 1 | 0 | 0 | 0 | 0 | 0 | 1 | 0 | 0 | 1 | 0 | 0 | 0 | 0 | 24 |
| 1 | 0 | 0 | 1 | 0 | 0 | 1 | 0 | 0 | 0 | 0 | 1 | 0 | 0 | 1 | 1 | 0 | 1 | 23 |
| 0 | 1 | 0 | 1 | 1 | 0 | 0 | 0 | 1 | 0 | 0 | 0 | 1 | 0 | 0 | 0 | 0 | 0 | 23 |
| 0 | 1 | 0 | 0 | 0 | 1 | 1 | 0 | 1 | 1 | 0 | 0 | 0 | 1 | 1 | 0 | 1 | 0 | 21 |
| 1 | 0 | 0 | 1 | 0 | 0 | 1 | 0 | 1 | 0 | 0 | 0 | 0 | 0 | 1 | 0 | 0 | 0 | 23 | c17 c18 c19 c20 c21 c22 c23 c24

CODE COMPACTION BY EVOLUTIONARY ALGORITHM

BACKGROUND OF THE INVENTION

1. Field of the Invention

This invention relates to the field of data storage, and in particular to the compaction of data and programming code for efficient storage.

2. Description of Related Art

In this "information age", the amount of information that is being stored or communicated continually increases. Despite advances in storage and communications technologies, however, a continuing need exists for optimizing the efficiency of information storage and communication by compacting the information itself. For example, physical space in a portable computing device is a premium resource, and has a practical limit. The minimization of storage requirements for application programs and data files will particularly benefit devices and systems having limited storage resources, such as portable computing devices, communications devices, electronic appliances, and the like. In a similar manner, a limited bandwidth communication channel can be more efficiently utilized by reducing the number of data elements required to communicate a given amount of information.

One method for compacting information within a data set is a dictionary lookup scheme. Symbols are defined in a dictionary to represent sequences that are repeated within the data set. Each occurrence of the sequence in the data set is replaced by the symbol representing the sequence. If the substituted symbol and the overhead associated with the dictionary consumes less storage space than the original occurrences of the sequences, then a savings in storage space is achieved. FIG. 1 illustrates such a compaction. The uncompacted data set 100 is converted to a compacted data set 110 by creating a macro dictionary 120 that associates unique symbols A, B, C, and D to represent sequences of symbols 'ec', 'aab', 'cad', and 'dab', respectively, in the uncompacted sequence 100. Consistent with common terminology, the sequences of symbols that are replaced by another symbol are termed macros; the process of replacing macro sequences by their macro symbol is termed tiling. The macro A, corresponding to sequence 'ec' 101, is identified as the first sequence in the data set 100 that is repeated, at 101'. The macro B, corresponding to sequence 'aab' 102, is identified as the next sequence in the data set 100 that is repeated, at 102'. The macro C, corresponding to sequence 'cad' 103, is identified as the next sequence in the data set 100 that is repeated, at 103'. The macro D, corresponding to sequence 'dab' 104, is identified as the next sequence in the data set 100 that is repeated, at 104', 104". The original data set 100 is converted to the compacted data set 110 by replacing each occurrence 101, 101', 102, 102', 103, 103', 104, 104', 104" of the macro sequences 'ec', 'aab', 'cad', and 'dab', with their corresponding macro symbols A, B, C, and D, respectively. The original data set 100 is recoverable from the compacted data set 110 and the macro dictionary 120 by replacing each occurrence of the macro symbols A, B, C, D, with the corresponding macro sequences 'ec', 'aab', 'cad', and 'dab'.

The original data set 100 contains 28 symbols. The compacted data set 110 contains 12 symbols and the dictionary 120 contains 11 symbols. Assuming that the storage requirements for the data sets 100, 110 and dictionary 120 are directly proportional to the number of symbols being stored, the compaction of FIG. 1 results in an 18% storage requirement reduction ((28−(12+11))/28). In like manner, if the original data set 100 is intended for communication via a limited bandwidth communications channel, the transmission of the compacted data set 100 and dictionary 120 will result in an 18% bandwidth reduction.

As is evident to one of ordinary skill in the art, the aforementioned reduction in storage and communication requirements depends upon the selection of sequences that are replaced by macro symbols. For example, if macro sequence 'ec' 101, 101' had not been selected for replacement by the macro symbol A, a macro sequence 'caab' could have been formed by including the symbol c in the macro sequences 102, 102', resulting in a reduction in the number of symbols in the dictionary 120 and compacted data set 110. Other macro sequence groupings may result in an increase or decrease in the number of symbols in the dictionary 120 or compacted data set 110.

A common method of determining which sequences to select as macros is based on a "greedy" algorithm. A worth figure is associated with each possible macro sequence, and the greedy algorithm, as its name implies, selects the sequence having the greatest worth. Thereafter, the next macro sequence having the greatest marginal worth is selected, and so on. FIG. 2 illustrates an example determination of worth for repeated sequences in the data set 100. Each repeated sequence of up to four symbols in the data set 100 is evaluated for worth, independent of all other sequences. Consider, for example, the sequence 'ec', which occurs twice 101, 101' in the data set 100. Placing this sequence in the dictionary 120 requires two symbols; replacing the occurrences 101, 101' of the macro sequence 'ec' with the macro symbol A saves one symbol per occurrence 101, 101'. Thus, the worth of using the sequence 'ec' as a macro is zero (2 occurrences *1 symbol savings per occurrence-2 symbols in the dictionary), as illustrated in the line 201 of FIG. 2. The sequence 'ca', on the other hand, occurs four times in the data set 100, and has a worth of two (4 occurrences *1 symbol savings per occurrence-2 symbols in the dictionary), as illustrated in the line 202 of FIG. 2. In like manner, illustrated in the line 205 of FIG. 2, the sequence 'abca' occurs three times in the data set 100, and has a worth of five (3 occurrences *3 symbol savings per occurrence-4 symbols in the dictionary). As would be evident to one of ordinary skill in the art, if the macro symbol is smaller or larger in size than the original symbols in the data set, or the storage of the original symbols in the dictionary requires more or less storage resources, the determination of the worth of each sequence will be affected correspondingly.

The "worth" of each sequence can be defined in a number of ways. In the above examples, the worth is defined solely as the reduction in storage requirements. The worth of a macro may also be based, for example, upon the difficulty or time penalty associated with replacing certain sequences, and so on. That is, for example, short sequences may be easier or quicker to replace than long sequences, and thus the worth of longer sequences may be attenuated, as compared to a worth based solely on storage requirements. However the worth is defined, the greedy algorithm is used to attempt to maximize the defined worth of the compaction process by selecting the sequences having the maximum defined worth. As is known to one of ordinary skill in the art, however, selecting sequences having maximum worth does not necessarily guarantee that the final solution will produce a maximum worth.

FIG. 3 illustrates the results of applying the greedy algorithm to the data set 100 using the defined worth determinations illustrated in FIG. 2. The sequence 'abca' has the maximum worth, as defined above, with a symbol savings of 5. Replacing each occurrence 301, 301', 301" of 'abca' with macro symbol A 311, 311', 311" in the compacted data set 310 results in a 5 symbol reduction in the total number of symbols (19 symbols in the compacted data set 310, plus 4 symbols to store the sequence 'abca' in a dictionary (not shown)). In accordance with the greedy algorithm, the repeated sequences in the compacted data set 310 are then identified and evaluated. Note that the worth of a given sequence may be different when applied to a compacted data set than when applied to the original data set. The term marginal worth is commonly used to define the worth of a parameter that may change as a process continues; the marginal worth being the worth at a given point in the process. The greedy algorithm selects the sequence having the greatest marginal worth relative to the compacted data set 310 and produces a subsequent compact data set by replacing the selected sequence with its macro symbol. Thereafter, the sequence having the greatest marginal worth with regard to this subsequent compacted data set is identified and selected, and another compacted data set formed using this selected macro sequence. This repeated compaction-reevaluation-selection process continues until the marginal worth of subsequent selections is below some cutoff value, or until some maximum of macro sequences is exceeded. In the example of FIG. 3, upon selecting 'abca' as a macro, the marginal worth of all the three-tuples and four-tuples of FIG. 2 are null, because none of the three-tuples or four-tuples of FIG. 2 are repeated in the compacted data set 310. The two-tuple sequences 'ec', 'de', 'ab', and 'ed' are repeated in the compacted data set 310, but each have a marginal worth of zero (2 occurrences *1 symbol per occurrence-2 symbols in a dictionary). Thus, the greedy algorithm ceases, providing the compacted data set 310 as its solution, with a total symbol requirement of 23. As will be discussed below and illustrated in FIG. 6, there is at least one other solution that requires fewer than 23 symbols, and thus, the solution provided by the greedy algorithm in this example is sub-optimal.

The optimal solution can be found by exhaustively evaluating all possible macro sequence selections, and all possible applications of the possible macro selections. That is, for example, macro sequence 'abca' occurs three times in the data set 100. FIG. 3 illustrates a compaction based on the selection of macro sequence 'abca' and the replacement of each occurrence of this macro sequence. Another possible combination is the selection of sequence 'abca' and the replacement of only the first two occurrences of this macro, or the last two occurrences, or the first and third occurrences. Similarly, each of the three occurrences may be solely replaced. Thus, this one sequence alone requires the evaluation of seven possible options. These seven possible options would have to be evaluated for every subsequent possible option of every other repeated sequence. Even if the solution is restricted to the use of only 2, 3, and 4-tuple sequences, it is estimated that a data set that contains 1700 symbols could require over $10^{131}$ evaluations for an exhaustive search; a data set that contains 18000 symbols could require over $10^{425}$ evaluations.

Given a particular method for determining marginal worth, the greedy algorithm evaluates a minuscule number of possible options. In the example of FIG. 3, the greedy algorithm evaluated one possible option of the hundreds of possible options for the compaction of data set 100. Although the greedy algorithm is somewhat effective for finding good solutions, it is believed that better results may be obtained by expanding the scope of evaluations to include a larger sampling of the possible options.

BRIEF SUMMARY OF THE INVENTION

It is an object of this invention to provide a code compaction method and apparatus that is based upon numerous samplings of the possible options available to effect the compaction. It is a further object of this invention to provide a means for choosing samples that have a higher likelihood of providing an improved compaction.

These objects and others are achieved by providing a method and apparatus for code compaction that is guided in the selection of compaction options by an evolutionary algorithm process. In a preferred embodiment, a random population of sets of compaction options are generated and the compaction effectiveness of each is evaluated. This random population is partitioned into pairs of "parents", and each pair of parents produce a pair of "offspring". In the production of offspring, the parents pass on their compaction options, similar to the passing on of genetic characteristics between natural parents and offspring. The effectiveness of the compaction provided by each of the offspring is evaluated, and a "survival of the fittest" algorithm is applied to identify the "individuals" that have the best compaction effectiveness. These preferred individuals are partitioned into pairs of parents who produce pairs of offspring, and the most compaction-effective individuals are selected to be parents for the next generation. This process continues until subsequent generations show insignificant improvement, and the best individual is selected as the solution. In an alternative embodiment, to further expand the search space, random mutations are introduced when subsequent generations show insignificant improvement, and the process is repeated.

BRIEF DESCRIPTION OF THE DRAWINGS

The invention is explained in further detail, and by way of example, with reference to the accompanying drawings wherein:

FIG. 2 illustrates an example determination of worth factors for repeated sequences in a data set.

FIG. 3 illustrates an example compaction of a data set using a conventional greedy algorithm.

FIG. 5 illustrates an example application of an evolutionary algorithm for directing the search for a preferred compaction of a data set in accordance with this invention.

FIG. 6 illustrates an example compaction of a data set in accordance with this invention.

DETAILED DESCRIPTION OF THE INVENTION

Figure 1:
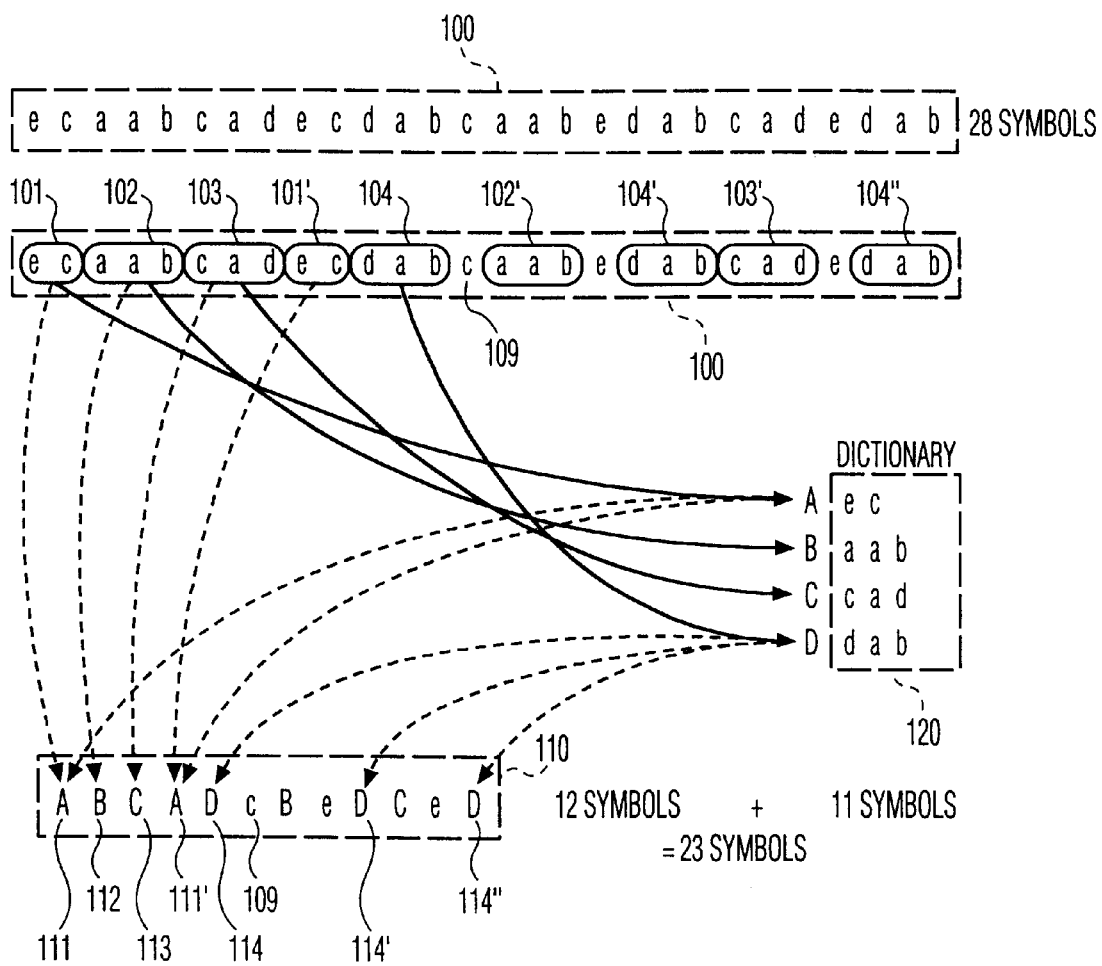
FIG. 1 illustrates an example compaction of a data set.

A class of algorithms have been developed that operate via an iterative offspring production process. These iterative offspring production processes are commonly termed evolutionary algorithms, and include genetic algorithms, mutation algorithms, and the like. In a typical evolutionary algorithm, certain attributes, or genes, are assumed to be related to an ability to perform a given task, different combinations of genes resulting in different levels of effectiveness for performing that task. The evolutionary algorithm is particularly effective for problems wherein the relation between the combination of attributes and the effectiveness for performing the task does not have a closed form solution.

The offspring production process is used to determine which particular combinations of genes are most effective for performing a given task, using a directed trial and error search. A combination of genes, or attributes, is termed a chromosome. In the genetic algorithm class of evolutionary algorithms, a reproduction-recombination cycle is used to propagate generations of offspring. In the reproduction phase of the reproduction-recombination cycle, members of a population having different chromosomes mate and generate offspring. These offspring have attributes passed down from the parent members, typically as some random combination of genes from each parent. In a classic genetic algorithm, the individuals that are more effective than others in performing the given task are provided a higher opportunity to mate and generate offspring. That is, the individuals having preferred chromosomes are given a higher opportunity to generate offspring, in the hope that the offspring will inherit whichever genes allowed the parents to perform the given task effectively. The recombination phase of the reproduction-recombination cycle effects the formation of the next generation of parents based on a preference for those exhibiting effectiveness for performing the given task. In this manner, the number of offspring having attributes that are effective for performing the given task will tend to increase with each generation. Paradigms of other methods of generating offspring, such as asexual reproduction, mutation, and the like, are also used to produce generations of offspring having an increasing likelihood of improved abilities to perform the given task.

In the context of this disclosure, the population consists of members having chromosomes that reflect different combinations of abilities for macro substitution. Some combinations of abilities for macro substitution are more effective for compacting a data set than other combinations. In accordance with this invention, by generating offspring from the members having chromosomes that are more effective for compaction than others, the effectiveness of the offspring for compacting the data set is likely to increase.

A multitude of evolutionary algorithms are available that may be employed in accordance with this invention. The CHC Adaptive Search Algorithm has been found to be particularly effective for complex combinatorial engineering tasks, such as configuring a pick and place machine for printed circuit boards, as detailed in U.S. Pat. No. 5,390,283, incorporated herein by reference. As compared to other evolutionary algorithms, the CHC algorithm is a genetic algorithm that employs a "survival of the fittest" recombination phase, wherein only the better performing individuals, whether parent or offspring, are provided for the subsequent reproduction phase. To counteract the adverse genealogical effects that such selective survival can introduce, the CHC algorithm avoids incestuous matings, matings between individuals having very similar attributes. As would be evident to one of ordinary skill in the art, each evolutionary algorithm exhibits pros and cons with respect to the schema used to effect an iterative solution, and the particular choice of evolutionary algorithm for use in this invention is optional. For clarity and ease of understanding, the details of this invention are presented using techniques common to the CHC algorithm, although the use of other evolutionary algorithms would be evident to one of ordinary skill in the art in the context of this disclosure.

Figure 4:
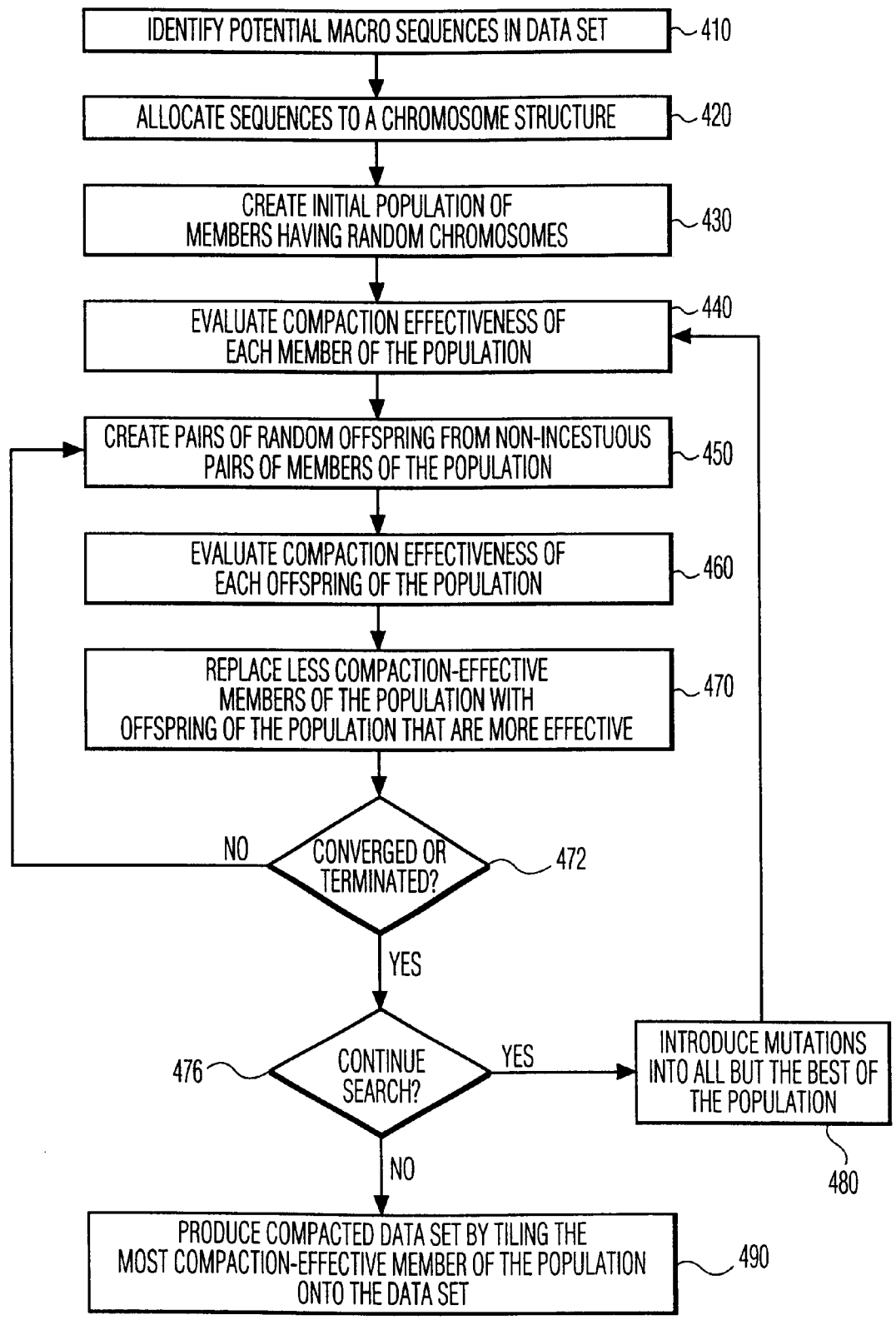
FIG. 4 illustrates an example flow diagram for the use of an evolutionary algorithm to direct a search for a preferred compaction of a data set in accordance with this invention.
Figure 5A:
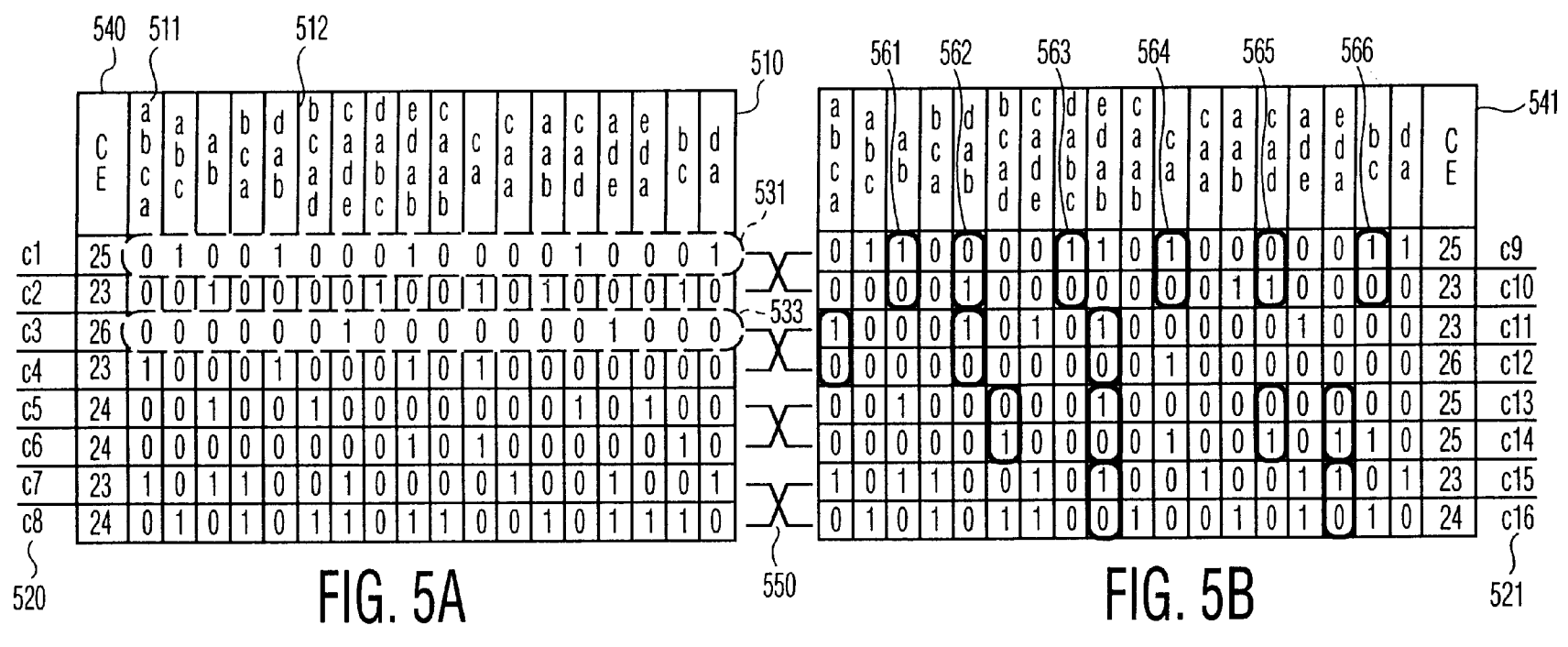

FIG. 4 illustrates an example flow diagram for the use of an evolutionary algorithm to direct a search for a preferred compaction of a data set in accordance with this invention. At 410, the data set is assessed and sequences that are repeated in the data set are identified. As noted in FIG. 2, the potential worth of a sequence is dependent upon the length of the sequence, the number of times that the sequence appears in the data set, the cost of storing the sequence, and other factors. In a preferred embodiment, to reduce the complexity of subsequent tasks, the identification of possible macro sequences at 410 is dependent upon the factors affecting the potential worth of the sequence for compacting the data set. That is, for example, sequences having a maximum potential worth below a specified minimum are not identified as potential macro sequences. In a similar manner, the length of a macro sequence may be limited for ease of processing. FIG. 5 illustrates 18 macro sequences 510 of up to 4 symbols that are associated with the example data set 100 of FIG. 1. There are 23 repeated sequences of up to four symbols in the example data set 100, as listed in FIG. 2, plus at least one five symbol repeated sequence 'abcad' and a six symbol repeated sequence 'abcade'. The repeated sequences 'ec', 'aa', 'ad', 'de', and 'ed' are not identified as macro sequences because they have a worth, in this example, of zero. In like manner, the list of macro sequences may be further reduced by not including the sequences 'bc', 'da', 'caa', 'aab', 'cad', 'ade' that have a worth of one.

At 420, the macro sequences are allocated to a chromosome structure. In a straightforward allocation, the chromosome structure is defined as a set of binary genes, each macro sequence being associated with each gene of this set of genes. The binary gene has one value that indicates the presence of the associated macro sequence, and another value that indicates the absence of the associated macro sequence. In this example, the chromosome is encoded as a binary number having as many bits as the number of possible macro sequences. Other allocations, or representations, may be employed, as discussed further below. Each macro sequence is allocated a position on the chromosome structure. As is discussed further below, for ease of processing, in a preferred embodiment, the order of position on the chromosome structure affects the compaction effectiveness of the chromosome. In the example of FIG. 5, the macro sequences 510 are presented in an order, from left to right, of decreasing worth, using the example worth determination illustrated in FIG. 2. That is, in the example compactions discussed above with regard to FIGS. 1–3, the macro sequence 'abca' 511 has a worth of 5 units, and is listed first from the left in FIG. 5. There are no other macro sequences with a worth of four or five; therefore, the next four column headings 512 are the macro sequences having a worth of three: 'abc', 'ab', 'bca', and 'dab'. Thereafter, the macro sequences having a worth of two and one, respectively, are placed as subsequent column headings.

At 430, an initial population of members is generated. The number of members in the population is dependent upon the magnitude of the compaction task. As noted above, the number of possible combinations of macro selections for a typical data set is extremely large. The aforementioned population is a small sampling of the possible combinations. In a preferred embodiment, the number of members of the population is at least fifty. In the example of FIG. 5, there are eight members $c1$–$c8$ 520 in the initial population illustrated at 5A. Each member of the initial population has a chromosome representing a unique set of attributes for macro substitution. In a preferred embodiment, the unique chromosomes are generated via a random process. Using the aforementioned binary chromosome structure, each member c1–c8 520 has a random sequence of 0's and 1's allocated to each chromosome position. A "1" in the chromosome position of a particular macro sequence indicates the presence of that macro sequence 510 attribute in the corresponding member 520. For example, the member c1 has a chromosome 531 that is a combination of macro sequence 'abc', 'dab', 'edab', 'cad', and 'da' attributes. That is, the member c1 has the ability to tile any combination of the macro sequences 'abc', 'dab', 'edab', 'cad', or 'da' to the data set 100. Member c3, on the other hand, has the ability to tile any combination of the macro sequences 'cade' or 'ade' to the data set 100, as indicated by the chromosome 533 of member c3.

Continuing with the example flow of FIG. 4, the compaction effectiveness of each current member of the population is evaluated at 440. As noted above, each member of the population has a set of macro sequence attributes that can be tiled to the data set to produce a compacted data set. As also noted above, alternative methods are available for effecting the tiling of combinations of macros, such as the greedy algorithm. The greedy algorithm can be applied, for example, to determine which of the available member macro sequence attributes to apply first, second, third, and so on. For example, the greedy algorithm applied to member c1 would apply either macro sequence 'abc' or 'dab' first, because macro sequences 'abc' and 'dab' have a worth of three, compared to a worth of 2 for macro sequence 'edab'. Thereafter subsequent macro sequences in member c1 would be applied, depending on their marginal worth. As is evident to one of ordinary skill in the art, however, the greedy algorithm requires significant resources as it computes the marginal worth of each alternative after each tiling of a macro sequence. To reduce computational complexity, a straightforward fixed order tiling is used in a preferred embodiment. Because the macro sequences are ordered by potential worth from left to right in the chromosome structure, a single pass greedy-like application is effected by tiling each available macro sequence in a left to right manner. That is, for example, member c1 of FIG. 5 is evaluated for compaction effectiveness at 440 by tiling the macro 'abc' first, then 'dab', then 'edab', then 'cad', then 'da'. Some of these tilings will have no effect on the compaction process. For example, after tiling 'dab' on the data set 100, all occurrences of 'dab' in the sequences 'edab' will be replaced by the macro symbol for 'dab', and the marginal worth of the sequence 'edab' will thereafter be null because the sequence 'edab' no longer occurs in the resultant data set. As would be evident to one of ordinary skill in the art, optimization techniques can be applied at the block 440 to eliminate the need to attempt to tile sequences that are known or determined to have no subsequent marginal worth, or that have a marginal worth that is below a given minimum. In the example of FIG. 5, the computation effectiveness CE 540 of each member 520 is illustrated as the total number of symbols in the compacted data set and dictionary after tiling the available macro sequences 510 of each member 520. That is, applying the macro sequences of member c1 as discussed above results in a combined storage requirement for the compacted data set and dictionary of 25 symbols. Member c2 is able to achieve a storage requirement of 23 symbols, member c3 a storage requirement of 26, and so on.

At 450, members (e.g. c1–c8 520 in FIG. 5) are paired for mating and produce offspring (c9–c16 521 in FIG. 5). Because the CHC algorithm is used in this example embodiment, the matings are constrained to be among non-incestuous members. In a preferred embodiment, the "Hamming distance" between the chromosome of pairs of members is used to determine the most divergent members of the population for mating. Alternatively, as illustrated in FIG. 5, adjacent members c1–c2, c3–c4, c5–c6, and c7–c8 are paired; if it is apparent that two adjacent members have very similar attributes, the pairings are modified or the adjacent members are rendered sterile. The pairings are indicated in FIG. 5 by the cross symbols 550 between the chromosome sets 5A and 5B. In a preferred embodiment of this invention, a uniform crossover mating scheme is employed. The mating of a pair of members produces a pair of offspring that have the same genes as their parent when both parents have the same gene value, and a random assortment of their parents attributes when the parents' genes differ. For example, in FIG. 5, members c1 and c2 are mated to produce offspring c9 and c10. Members c1 and c2 have identical genes in the first (abca), fourth (bca), sixth (bcad), seventh (cade), tenth (caab), twelfth (caa), fifteenth (ade), and sixteenth (eda) chromosome positions. Therefore, their offspring will have the identical gene in each of these positions. That is, for example, neither parent c1 nor c2 have the macro sequence 'abca' attribute; therefore, neither of their offspring c9, c10 can have the macro sequence 'abca' attribute. The parents c1, c2 differ in each of the other chromosome positions. Each of the offspring c9, c10 inherit gene values from each of the parents c1, c2 in a random "crossover" manner. For example, offspring c9 inherits c1's attributes at the second, ninth, thirteenth, and eighteenth positions, and c2's attributes at the third, fifth, eighth, eleventh, fourteenth, and seventeenth positions. Offspring c10 inherits the opposite parent's attributes at these positions. As illustrated in 5B of FIG. 5, this random crossover is effected by copying the parents c1 and c2 chromosomes to the offspring c9 and c10, respectively, and then "flipping" the gene values at random chromosome locations 561–566. Each of the circled gene pair values of chromosome set 5B represent flipped, or crossed over, gene values as compared to chromosome set 5A.

Each of the resultant offspring will exhibit a compaction effectiveness based on their inherited chromosomes. These effectiveness measures are evaluated at 460 of FIG. 4, and are illustrated in FIG. 5 as measures 541 associated with each offspring c9–c16 521. As illustrated, offspring c9 has an compaction effectiveness measure of 25, offspring c10 has a compaction effectiveness of 23, and so on. Note that not all matings result in improved offspring. Members c5 and c6, each having an effectiveness measure of 24, produce a pair of offspring c13 and c14 each having an effectiveness measure of 25.

At 470, better performing offspring replace poorer performing members of the population. In the example of FIG. 5, offspring c10, c11, and c15 have an effectiveness measure of 23, while member c3 has an effectiveness measure of 26, member c1 has an effectiveness measure of 25, and members c5, c6, and c8 have an effectiveness measure of 24. Therefore, members c3, c1 and one of the members c5, c6, and c8 are replaced by the better performing offspring c10, c11, and c15 for subsequent reproduction-recombination cycles.

By repeating the reproduction-recombination process, the characteristics of the resultant members of the population will tend to converge to a common solution. The process repeats the loop 450–472 until the population converges, or until the loop is terminated, for example upon reaching a given time limit or other termination limit.

Block 476 is used to assure that the first converged solution is not necessarily used blindly. As is characteristic of most directed trial and error searches, the search may converge to a local minimum, which may or may not be associated with the true minimum. At 476, the entire reproduction-recombination process is repeated by mutating some of the members of the population, at 480, and repeating the iterative process 440–472. In a preferred embodiment of this invention, all members except the best performing member of the population are replaced by mutated members. The method of mutation may vary; in a preferred embodiment, the mutated members are formed by introducing random changes of limited scope to the chromosome of the best performing member, thereby effecting a sampling in a search space about the best performing member. Because the CHC algorithm employs a "survival of the fittest" propagation strategy, and the best performing member is retained through each mutation-restart cycle, the repetition cannot cause a regression to a poorer solution.

Several halting criteria can be used to determine when to cease the evolutionary process, at 476. For example, if the same best performing member is repeatedly identified at each mutation-restart cycle, the evolutionary process is halted. In like manner, if the rate of improvement in compaction is slight through each mutation-restart cycle, the evolutionary process may be halted. Similarly, if a maximum time limit is exceeded, the evolutionary process is halted. These and other iteration-halting techniques are common in the art. When the process is terminated, the best member of the population is used to tile the data set to produce the best compacted data set found by this evolutionary algorithm process, at 490.

For completeness, FIG. 5 illustrates the results of the next reproduction-recombination cycle. As illustrated, the new set of members 522 include the better performing offspring c10, c11, and c15, and the original better performing members c2, c4, c6, c7, and c8. The arrangement of the members 522 in the chromosome set 5C is structured so that matings of differing members occur. As noted above, the Hamming distance between members can be used to maximize the diversity within each pair of matings. Illustrated in FIG. 5, members c15 and c2 mate to produce offspring c17 and c18. Note that both members c15 and c2 have the macro sequence 'ab' attribute, as indicated by the "1"s in the 'ab' column of chromosome set 5C; therefore, both offspring c17 and c18 have the macro sequence 'ab' attribute. Random crossovers during the mating process are indicated by the circled pairs on chromosome set 5D.

The compaction effectiveness of each offspring c17–c24 523 is shown in the CE 543 column of FIG. 5. Of particular note is the compaction effectiveness of offspring c23. The tiling of the macro sequences 'dab', 'bcad', 'cade', 'edab', 'caab', 'ade', and 'bc' corresponding to the macro attributes of the offspring c23, in that order, to the data set 100 is illustrated in FIG. 6. After the macro sequence 'dab' is tiled 601, 601', 601'', there are no occurrences of 'bcad' remaining in the data set 100, and therefore the macro sequence 'bcad' is unused in this compaction. In like manner, macro sequences 'edab', 'ade', and 'bc' are unused. Using macro symbols A, B, and C for the macro sequences 'dab' 601, 601', 601'', 'caab' 602, 602', and 'cade' 603, 603' that are used, the compacted data set 610 includes 10 symbols, and the dictionary includes 11 symbols, for a total storage requirement of 21 symbols. Thus, in this example, the evolutionary algorithm provides at least one better solution than the conventional greedy algorithm, discussed above and illustrated in FIG. 3. This better performing offspring c23 and one of the offspring c17, c18, c19, c21, c22, c24 replace the poorer performing members c6 and c8 for subsequent reproduction-recombination cycles. Because of the large number of tied effectiveness measures of 23, a random process could be used to choose among the members and offspring to determine the next set of members to mate; alternatively, the Hamming distances among the set of tied members and offspring can be used to select as new members those having the most diversity.

The above details present a preferred method and example of the use of an evolutionary algorithm for directing a search for finding an efficient compaction scheme for a data set. Based on this preferred method and example, alternative methods would be evident to one of ordinary skill in the art, as discussed below.

The chromosome structure need not be a one to one correspondence between the number of macro sequences and the number of bits in the chromosome. Methods and techniques for structuring a representation for efficient storage or processing are common in the art. The structure of the chromosome could be a tree structure, with similar attributes being collected within branches of the tree. The evolutionary algorithm in this case would be structured to process the tree structure in a hierarchical manner, allowing for the foreshortening of processing when a particular branch or limb is deemed worthless. For example, a tree corresponding to the data set 100 could be structured with a branch corresponding to all macro sequences containing the sequence 'ab', such as 'ab', 'abc', 'abce', 'dab', and the like. If the member does not contain an 'ab' branch attribute, none of the macro sequences containing 'ab' as a sub-sequence need be evaluated or propagated. In like manner, noting that the chromosomes typically contain relatively few macro sequence attributes, sparse matrix techniques common in the art can be used to minimize the memory requirements for processing the sets of chromosomes. The genes of a chromosome need not be limited to macro sequences. For example, the chromosome can be structured to effect an evaluation of the effectiveness of different representations of the problem, or an evaluation of the effectiveness of different algorithms. That is, for example, one of the genes of a chromosome could represent whether to apply the macro attributes in a particular order. If the application of the macro applications in this particular order improves the compaction effectiveness, it is likely that the preferred offspring will contain this gene. These and other chromosome representation techniques would be evident to one of ordinary skill in the art in view of this disclosure. For example, a preferred embodiment that has proven to be effective in the compaction of programming code using a fixed length macro dictionary uses a binary representation, functionally equivalent to the bit selection scheme described above, that encodes the indices directly using Binary Reflective Gray coding. Genes are encoded on a chromosome using k log 2 bits, where k is the length of the macro pool (the number of possible macro sequences), and each gene when decoded represents the decimal index of a macro sequence to be used for compaction. Duplicate indices on a single chromosome are termed collisions and collisions are resolved by choosing the next highest index not currently chosen by the chromosome explicitly. In this manner the number of genes in the chromosome is equal to the number of macros used in the compaction scheme. Thus, each gene maps directly to one macro as opposed to the position of a bit on the string mapping to a particular macro.

The genes can be recombined to produce offspring using the standard bitwise GA crossover operators. Alternatively, a special crossover operator can be used which only swaps indices that are on one parent but not the other. All indices that occur on both parents an equal number of times would also occur in the offspring, whereas indices that are not part of a matched pair would be swapped with some probability (e.g., 0.5). This operation would be combined with mutation, perhaps restricted to only those pairs of differing indexes that are not swapped. The following example illustrates how the special crossover operator would work:

Parent 1: 2 4 9 6 5 4 7 4 8 3

Parent 2: 4 9 3 4 6 1 0 7 3 1

Below, the X's show the locations of members of pairs that are unmatched, and so are candidates for swapping.

Parent 1: X 4 9 6 X 4 7 X X 3

Parent 2: 4 9 3 4 6 X X 7 X X

Below, only the candidates for swapping are shown:

2 and 1, 5 and 0, 4 and 3, and 8 and 1.

Parent 1: 2 \_\_\_\_\_ 5 \_\_\_ 4 8 \_

Parent 2: _____ 1 0 \_3 1

Suppose the first and fourth swapping candidates are chosen.

Then the offspring would be:

Child 1: 1 4 9 6 5 4 7 4 1 3

Chile 2: 4 9 3 4 6 2 0 7 3 8

The two pair of indices that were not swapped, 5 and 1, and 4 and 0, would be candidates for mutation, i.e., randomly chosen indices would be substituted.

The determination of compaction effectiveness is a function of the methods used to represent the compacted data set and the methods used to create a dictionary. In the prior examples, the replacement of a macro sequence by a macro symbol resulted in one symbol replacing the number of data set symbols in the length of the macro. In such an example, the size of the macro symbol is assumed to be the same size as the symbols used in the original data set (hereinafter "data set symbols"). As is known in the art, the size of a symbol determines the number of possible unique symbol representations; for example if the size of the symbol is 8 bits, then there are 256 possible unique symbols that can be represented by these 8 bits. To distinguish macro symbols from data set symbols, each macro symbol must be unique. If the data set symbols do not allow for the addition of unique macro symbols within the original size of the symbol, the size must be increased. Thus, the "cost" of adding a macro is larger than a one symbol substitution. Common in the art, one unique symbol, such as an "escape character" is identified for indicating that the next symbol is a macro symbol, rather than a data set symbol. Thus, the cost of adding a macro symbol is the size of the escape character plus the size of the macro symbol itself. In another example, a given number of macro symbols may be uniquely identified within the original size of the data set symbols, but once that number is exceeded, subsequent macros incur an additional cost. Thus, the marginal cost of a macro would change depending upon the number of prior selected macros. In another example, the dictionary may be structured as a fixed size array, having a fixed number of possible macro symbols, each macro symbol having a macro sequence that is placed in a fixed width storage location. For example, an 8×4 dictionary may be defined that can hold up to eight macro sequences, each macro sequence containing four symbols or fewer. Regardless of the number of macros up to eight, or the length of each macro sequence up to 4, the same 8×4 fixed size for the dictionary is allocated. Thus, the marginal cost of adding each macro up to eight is null, because the dictionary exists whether it is filled or not. In like manner, a "general purpose" dictionary may be provided that is associated with multiple data sets, and each data set may have an associated "special purpose" addendum to this general purpose dictionary. If a macro sequence in the data set corresponds to an entry in the general purpose dictionary, the marginal cost of using the general purpose macro will be less than that of a special purpose macro, because the cost of the general purpose dictionary will be distributed among the multiple data sets, or disregarded as a sunk cost. In a communications application, once the general purpose dictionary is communicated to the receiver, subsequent transmissions of compacted data sets need not include the general purpose dictionary, and thus the cost of using macros from the general purpose dictionary is null. These and other symbol allocation and dictionary processing techniques and their associated costs would be evident to one of ordinary skill in the art.

The initialization of members of the population can be effected in a variety of forms. A random gene determination has been presented above. Alternatively, the greedy algorithm could be applied to the original data set and at least one of the members of the population could be initialized to the gene values corresponding to the greedy algorithm solution. In this manner, a solution provided by a "survival of the fittest" evolutionary algorithm can be assured to be at least as good as that provided by the conventional greedy algorithm. Similarly, if the chromosome is structured to represent groups of related macro sequence attributes, the initialization process can be biased to assure that each group is represented at least once in the initial population. In like manner, the "random" initialization process could be a weighted process wherein, for example, macro sequences having a higher potential worth are more likely to be selected than less productive sequences. These and other techniques of creating sets of members of a population having predefined or preferred attributes are common to one of ordinary skill in the art.

The definition and identification of macro sequences also affects the compaction effectiveness of each member of the population. For example, for storage efficiency, nested macro sequences may be supported. For example if macro symbol A represents the sequence 'bca', a macro symbol B could be defined as sequence 'dA', corresponding to 'dbca'; and a macro symbol C could be defined as sequence 'BcA', corresponding to the sequence 'dbcacbca'. By allowing for nested macro sequence definitions, the tiling of a sequence that is a subset of a longer sequence does not eliminate the use of the longer sequence for additional compaction.

Figure 7:
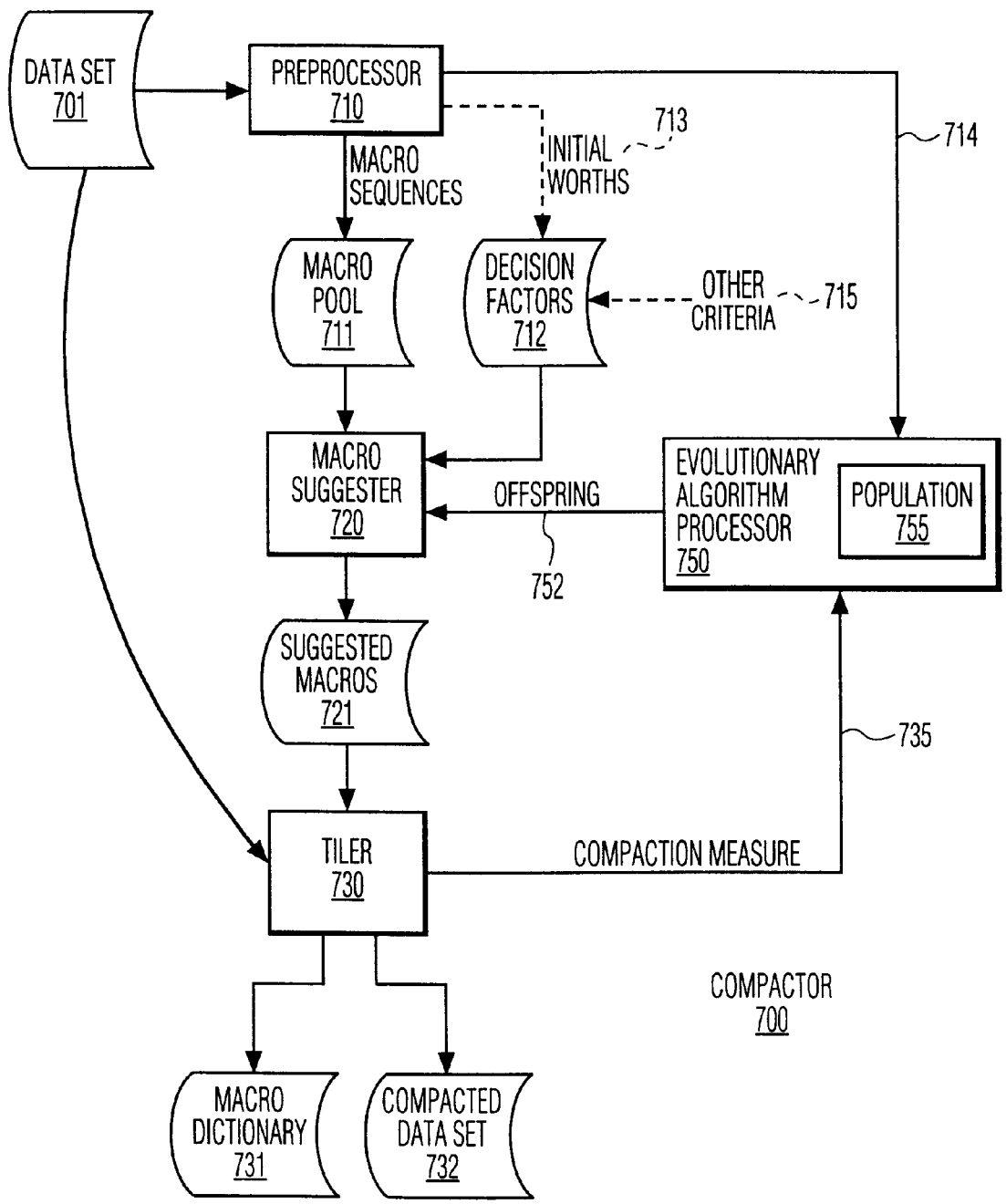
FIG. 7 illustrates an example block diagram of a code compactor in accordance with this invention.

FIG. 7 illustrates an example block diagram of a compactor 700 in accordance with this invention. The compactor 700 includes a preprocessor 710, a macro suggester 720, a tiler 730, and an evolutionary algorithm processor 750. When the compaction process commences, the preprocessor 710 processes the data set 701 to identify possible macro sequences within the data set 701. The possible macro sequences are stored in a macro pool 711. The preprocessor 710 also provides parameters 714 associated with the macro pool 711, such as the number of sequences in the macro pool 711, to the evolutionary algorithm processor 750. The evolutionary algorithm processor 750 produces a population of initial members having differing macro attributes, as discussed above with regard to blocks 410–430 of FIG. 4. The initial members form the population 755 from which the evolutionary algorithm processor 750 produces offspring 752. To initialize the evaluation process, each of the initial members of the population 755 are provided to the macro suggester 720 and tiler 730 to provide a compaction measure 735 associated with each of the initial members of the population 755, corresponding to block 440 of FIG. 4. Thereafter, as detailed below, the evolutionary algorithm processor 750 provides offspring 752 to the macro suggester 720 and tiler 730 to provide a compaction measure 735 associated with each of the offspring 752. Because the process of providing the compaction measure 735 of the initial members and the offspring 752 is identical, for ease of understanding, FIG. 7 and the following paragraphs specifically refer to the offspring 752.

The macro suggester 720 processes each offspring 752 to provide a set of suggested macros 721 from the macro attributes of each offspring 752. The macro suggester 720 may use a variety of decision factors to determine which of the macros that are derived from the offspring's macro attributes are to be provided to the tiler 730, and in which order. In a preferred embodiment, for example, the preprocessor 710 determines an initial worth 713 of each macro in the macro pool 711, and these initial worths 713 form decision factors 712, including the order in which macros are to be considered by the macro suggester 720. Other criteria 715 may also form the decision factors 712, such as dependencies between macros, bounds on the tiling process, and the like.

The data set 701 is tiled with each of the suggested macros 721 to form a compacted data set 732 and a macro dictionary 731 that includes each suggested macro 721 that is used in the compacted data set 732. The tiler 730 also determines the size of the compacted data set 732 and macro dictionary 731, and provides the measure of compaction effectiveness 735 that is used by the evolutionary algorithm processor 750 for evaluating each offspring 752.

The evolutionary algorithm processor 750 compares the compaction effectiveness 735 of each offspring 752 with the compaction effectiveness 735 of each member of the population 755 to determine the parents for the next generation of offspring 752. In a preferred embodiment, the evolutionary algorithm processor 750 produces a sorted list of the combination of the offspring 752 and the members of the population 755, based on the compaction effectiveness of each, and replaces the entire population 755 with the set of offspring 752 and/or members that have the better compaction effectiveness, as detailed in block 470 of FIG. 4.

After updating the population 755 with the most compaction-effective members, the evolutionary algorithm processor 750 uses the population 755 as parents to produce subsequent offspring 752, and the above process is repeated. The evolutionary algorithm processor 750 also effects the convergence determination and halt determination of blocks 472 and 476 of FIG. 4. When a restart is required, the evolutionary algorithm processor 750 mutates the population, but preferably not the best performing member, as discussed above. When the evolutionary process is halted, the evolutionary algorithm processor 750 provides the best performing member to the macro suggester 720 for presentation to the tiler 730 for a final compacted data set 732 and macro dictionary 731 corresponding to the best solution found by the evolutionary algorithm processor 750, and the process is terminated.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the tiler 730 need not explicitly create a compacted data set 732 and macro dictionary 731 for each suggested set of macros at each iteration of the evolutionary algorithm. The tiler 730 could produce a compaction measure 735 based on parametric data, such as the number of substitutions that would be made if a compacted data set 732 were actually produced. Similarly, the tiler 730 may contain a compaction estimator that provides a compaction effectiveness measure based on an estimate of the compaction that a given member will produce, rather than an actual calculation based on an exhaustive tiling.

As noted above, one of any number of evolutionary algorithms may be employed, and the terms and parameters discussed above should not be interpreted to imply an exclusion of any particular evolutionary algorithm. For example, in the details above, the term pair is used to identify two members who mate, or two offspring that are produced. As would be evident to one of ordinary skill in the art, the techniques presented herein are applicable to evolutionary algorithms that use fewer or more than two members for mating, and to evolutionary algorithms that produce differing numbers of offspring per mating, as well as to evolutionary algorithms that allow chromosomes to vary in length or complexity.

Although the invention is presented in the context of saving storage space or communications bandwidth, dictionary symbol substitutions are used in other applications as well. For example, in an encryption-decryption system, the dictionary could be used as a code book. If the sending and receiving devices in the system have the same dictionary, this invention could be used to provide a compacted data set based on the code dictionary. The sending device in this application merely transmits the compacted data set, without the dictionary. The receiving device decrypts the compacted data set by associating the code dictionary to the compacted data set.

This invention may be embodied in hardware, software, or a combination of both. For example, the tiler 730 may be a hardware engine that is optimized to efficiently replace sequences of data with symbols, and the evolutionary algorithm processor 750 may be an application program running on a general purpose computer. In like manner, the functional partitionings discussed above are presented for illustrative purposes only. For example, the tiler 730 could merely produce the compacted data set 732 and macro dictionary 731 as a file, and the evolutionary algorithm processor 750 could obtain the compaction effectiveness measure by accessing a system routine that returns the size of the file. These and other system architecture tradeoffs and optimizations would be evident to one of ordinary skill in the art and are within the spirit and scope of this invention.

We claim:

1. A compactor for compacting a data set comprising:
an evolutionary algorithm processor that is configured to generate a plurality of offspring chromosomes from a population of parent chromosomes,
a macro suggester, operably coupled to the evolutionary algorithm processor for receiving each offspring chromosome of the plurality of offspring chromosomes, and producing therefrom a set of macros corresponding to said each offspring chromosome, and
a macro pool that is configured to contain a plurality of macro sequences that includes a macro sequence corresponding to each macro of the set of macros corresponding to said each offspring chromosome,
a tiler, operably coupled to the macro suggester and the macro pool, that is configured to provide a compaction of the data set based on the macro pool and the set of macros corresponding to said each offspring chromosome, and wherein the evolutionary algorithm processor is further configured to modify the population of parent chromosomes based upon a compaction measure associated with the compaction of the data set corresponding to said each offspring chromosome.

2. The compactor of claim 1, wherein the evolutionary algorithm processor is configured to generate the plurality of offspring chromosomes from pairings of selected parent chromosomes in the population of parent chromosomes.

3. The compactor of claim 1, wherein the evolutionary algorithm processor is configured to generate the offspring chromosomes via the CHC algorithm.

4. The compactor of claim 1, wherein the tiler is further configured to generate a macro dictionary that includes at least one of the macro sequences corresponding to at least one offspring chromosome.

5. The compactor of claim 1, wherein the evolutionary algorithm processor is further configured to mutate at least one parent chromosome of the population of parent chromosomes.

6. The compactor of claim 1, wherein the macro suggester provides the set of macros based on a marginal worth of said each macro of the set of macros, the marginal worth being based on a compaction effectiveness measure associated with said each macro.

7. A method for compacting a data set comprising the steps of identifying a plurality of macro sequences within the data set and associating a macro attribute to each macro sequence of the plurality of macro sequences, generating a plurality of parental chromosomes, each parental chromosome having a corresponding set of macro attributes, evaluating each said parental chromosome to determine a parent compaction measure associated with each said parental chromosome, generating a plurality of offspring chromosomes based on the plurality of parental chromosomes via an evolutionary algorithm process, each offspring chromosome of the plurality of offspring chromosomes having a corresponding set of macro attributes, evaluating each offspring chromosome of the plurality of offspring chromosomes to determine an offspring compaction measure associated with said each offspring chromosome, identifying a plurality of preferred chromosomes based on the offspring compaction measure associated with said each offspring chromosome, and generating a compacted data set based on the set of macro attributes corresponding to a selected chromosome of the plurality of preferred chromosomes.

8. The method of claim 7, wherein the step of generating the compacted data set includes the step of substituting a macro symbol for at least one occurrence of the macro sequence within the data set corresponding to at least one macro attribute of the selected chromosome.

9. The method of claim 7, wherein the step of evaluating each offspring chromosome includes the steps of:

selecting at least one macro attribute from the offspring chromosome, tiling the at least one macro attribute on the data set to produce an offspring data set, determining the offspring compaction measure based on a size of the offspring data set.

10. The method of claim 9, wherein the step of selecting the at least one macro attribute from the offspring chromosome is based on a marginal compaction effectiveness of the at least one macro attribute.

11. The method of claim 10, wherein the step of determining the offspring compaction measure is also based on a size of the macro sequence corresponding to the at least one macro attribute.

* * * * *